INVENTORS
Earle W. Gard &
Blair G. Aldridge
BY Philip Subkow
ATTORNEY.

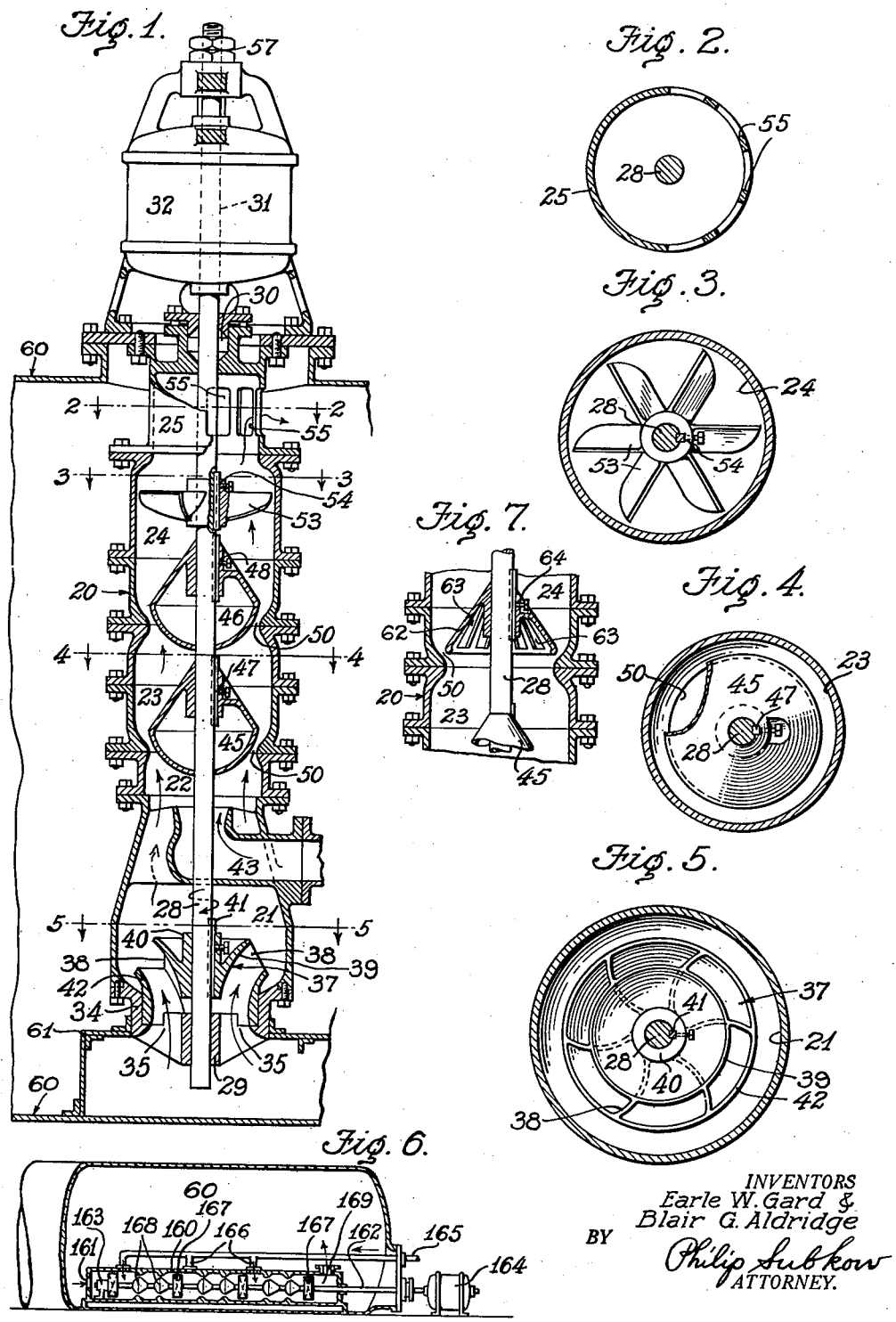

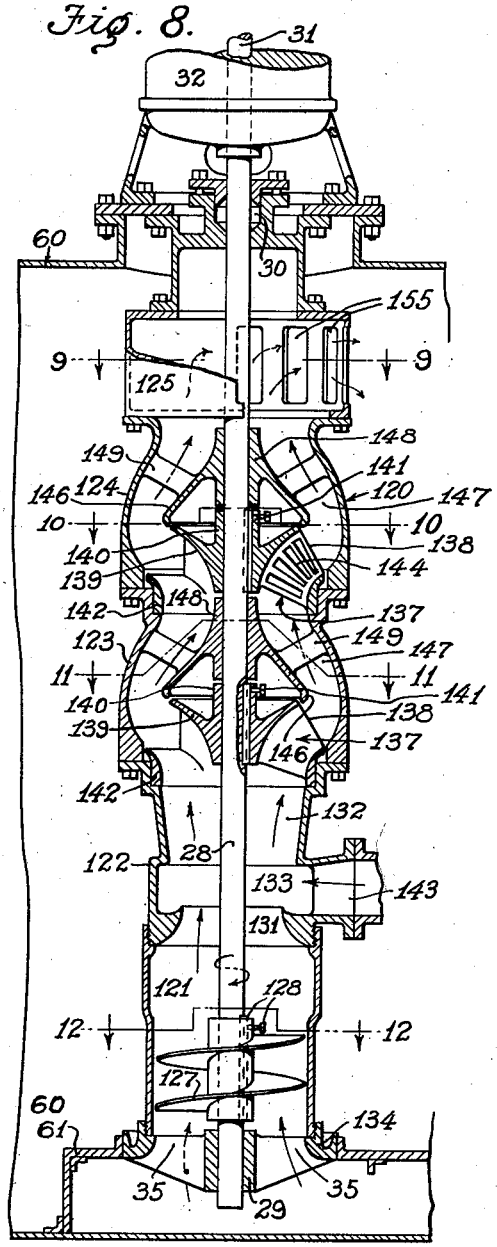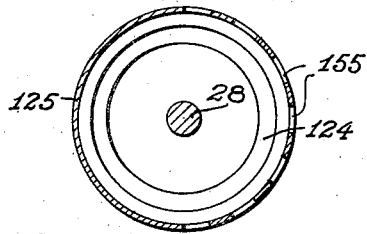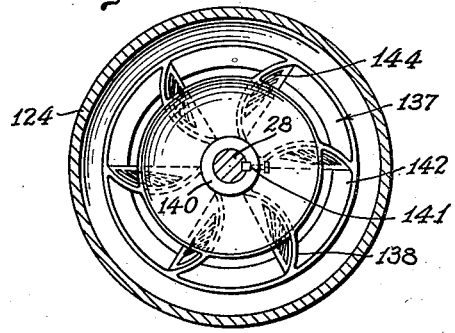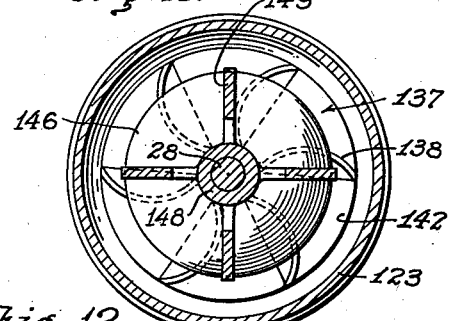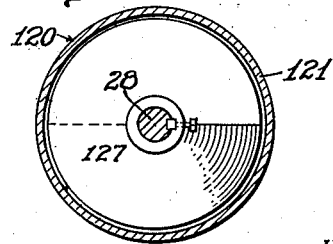

Patented Aug. 22, 1939

2,170,496

UNITED STATES PATENT OFFICE 2,170,496

PROCESS AND APPARATUS FOR INTERACTING FLUIDS

Earle W. Gard, Palos Verdes Estates, and Blair G. Aldridge, Los Angeles, Calif., assignors to Union Oil Company of California, Los Angeles, Calif., a corporation of California Application April 14, 1936, Serial No. 74,264

15 Claims. (Cl. 261—93)

The present invention relates to the treatment of petroleum products, and has particular reference to the production of high grade asphalt products suitable for any of the various uses in the art. More specifically, the invention pertains to certain improvements in a process and apparatus to be employed in the preparation of said high grade asphalt products.

The use of air, gas and steam in varying proportions to oxidize petroleum fractions has been used for many years. By varying the proportions of the air and steam, the quality of the oxidized asphalt thus produced may be controlled to a limited degree. However, in order to obtain asphalts of high melting point and having a high ductility and a desired penetration, it is necessary to produce an intimate mixture of the oil to be oxidized and the oxygen-containing gas, such as air or steam, so that all parts of the oil are uniformly exposed to the action of the gas. Such intimate contact of the gas with the oil to be oxidized is also essential because it permits efficient use of the oxygen content of the gas, and because such intimate contact permits the oxidation of the more refractory components of the oil.

The oxidation reaction being exothermic in nature, an increase in temperature occurs during the reaction. It has, therefore, been found that provisions should be made to control the temperature to prevent over-oxidation, such control being in the nature of heat-abstracting means.

The above-mentioned heat-abstracting means are necessary since the effect of oxidation is to actually heat the oil. This increase in temperature occurs even when the air is injected in a cold or unheated state, for in the majority of cases the heat of oxidation of oil more than offsets the cooling effect of the injected cold air.

In an attempt to obtain the desired controlled oxidation, it has been previously proposed: to maintain the oil to be oxidized in a heated still optionally provided with agitators; to maintain an atmosphere of air, steam, or other oxygen-containing gas, in said still above the oil therein; to control the temperature of the oil being oxidized as by means of cooling coils disposed within said oil; and to withdraw continuously a portion of said oil to be oxidized, commingle it with air and return the thus obtained mixture back into the mass of oil being oxidized. Such a procedure brings the oil in intimate contact with the air, this step being followed by the return of the mixture into the oil mass wherein the air is separated from the oil. The repeated and continuous recycling of the oil from the still, through the mixer, and back into the still (wherein the oil temperature is controlled), gradually and uniformly oxidizes the oil until the desired degree of oxidation has been obtained.

We have previously described and patented processes for oil oxidation, and particularly for the production of oxidized asphalts, in which the intimacy and duration of the contact of the asphaltic oil and oxygen have been controlled, and in which the temperature of the reacting mixture may also be regulated. These patents are Patent No. 1,953,345, No. 1,953,346, and No. 1,999,018.

It is an object of the present invention to provide a structure and a process which will be improvements on the processes and apparatuses of the above patents, as well as on all other processes of oxidation, reduction or chemical or physical interaction of oil, whether petroleum, animal or vegetable, or of other organic liquids in which an intimacy of mixture of the liquid and reacting gas is desired.

It is a further object of the invention to provide an improved structure adapted to withdraw continuously a measured quantity of oil or other liquid from a bulk supply, such as a still, to admit continuously into the withdrawn oil a measured stream of air or other gas, to agitate said mixture to obtain a thorough and intimate contact of the particles of said liquid and gas, and to return or discharge said mixture back into the still wherein the separation of the gas from the liquid, as for example the partially oxidized oil, takes place.

The use of circulating pumps with or without the use of jet mixers usually necessitates a considerable expenditure of energy. The velocities required for a proper comingling of the two fluids are such that the mixture still contains a considerable amount of energy (in the form of velocity and/or pressure) at the point of return to the body of liquid in the still. It is a still further object of this invention to utilize substantially all of such energy so that the liquid-gas mixture discharged from the circulating structure is substantially devoid of velocity and pressure head.

It is a still further object of the invention to provide a structure wherein the intermingling of the air and oil may be regulated at will. A further object is to provide a structure whereby the various parts may be readily assembled, disassociated and interchanged.

The above and other objects may be attained by a structure comprising a housing provided with oil and gas inlets, means in said housing adapted to suck a stream of oil continuously into said housing and to intimately commingle said oil with the air introduced thereinto, and discharge means for the thus produced mixture. More specifically, the invention comprises a pumping and agitating structure including a housing, means adapted to introduce a stream of oil into said housing, means for the introduction of a stream of oxygen-containing gas into said stream of oil, means within said housing adapted to thoroughly and intimately commingle said oil and gas, and means for the discharge of the thus obtained mixture out of said housing.

The invention still further includes a structure wherein the above mentioned mixing means are adjustable whereby a control of the degree of mixing may be obtained.

The invention still further includes a structure wherein means are provided whereby the velocity of the oil-air mixture may be recovered in the form of energy substantially prior to the passage of said mixture out of the structure through the discharge means, the thus recovered energy being employed to aid the actuation of the oil-introducing and mixing means.

The invention still further resides in the above-described type of structure wherein the oil and gas commingling means comprise mixers adapted to convey to said oil and gas a centrifugal force thereby causing said oil and gas to be thoroughly and intimately commingled.

The invention may further be stated to reside in an oil and gas pumping and agitating structure comprising a housing, means in said housing for the introduction of a stream of oil thereinto, means within said housing adapted to continuously move the thus introduced oil at substantially a uniform rate through said housing, means adapted to introduce an oxygen-containing gas into the moving stream of oil, pumping and agitating means adapted to further move said oil and gas mixture and to produce a thorough and intimate commingling thereof, and means for the discharge of the thus obtained mixture from said housing. The invention still further includes a structure of the type described hereinabove wherein the two pumping means are designed so that the gas may be introduced into the structure at a pressure independent of the pressure of the oil. Thus, the gas may be introduced at a reduced and even sub-atmospheric pressure even though the oil is maintained at a superatmospheric pressure.

Additional objects will appear from a description of the accompanying drawings, in which:

Figure 1 illustrates a vertical sectional view partly in elevation of an embodiment of a circulating pump and agitator structure built and assembled according to the present invention;

Figure 2 is a section taken along line 2—2 of Figure 1;

Figure 3 is a section taken along line 3—3 of Figure 1;

Figure 4 is a section taken along line 4—4 of Figure 1;

Figure 5 is a section taken along 5—5 of Figure 1;

Figure 6 is a diagrammatic sectional view on a reduced scale of a still or container for oil oxidation, said still being provided with a horizontally disposed multi-stage pump and agitating structure;

Figure 7 is a longitudinal sectional view of a modified agitator adapted to be employed in connection with the structure constituting the subject-matter of the present invention;

Figure 8 illustrates a vertical sectional view also partly in elevation of a further modified embodiment of a structure according to this invention;

Figures 9-12 are sections along lines 9—9, 10—10, 11—11, and 12—12, respectively of Figure 8;

Figure 13:
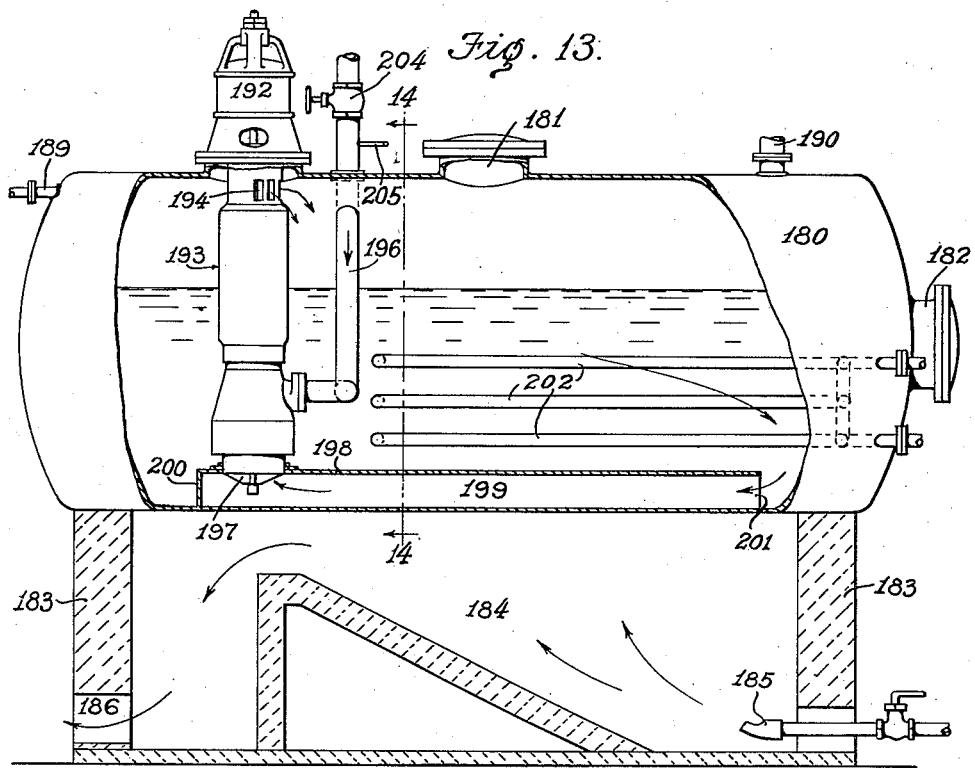
Figure 13 is a diagrammatic view, partly in elevation and partly in longitudinal section, through a still equipped with a vertically disposed pumping and agitating structure.

Referring now to the drawings and more particularly to Figure 1 and the sections shown in Figures 2-5 inclusive, the circulating pump and agitator assembly is enclosed in a housing generally indicated by the numeral 20 consisting of a plurality of sections 21 to 25 inclusive bolted to each other or otherwise united. These sections are generally annular in shape but have various constrictions described in greater detail hereinbelow. A shaft 28 extends vertically through the diametric center of housing 20. The lower end of said shaft 28 is supported by a bearing 29 provided at the lower end of section 21. The upper end of shaft 28 passes out of housing 20 through a packing gland 30, said shaft being attached directly or otherwise to the shaft 31 of an actuating motor 32. The lower end of section 21 consists of a casting 34 carrying the above-mentioned bearing 29. This casting is provided with a plurality of openings 35 adapted to communicate the interior of section 21 with the outside. Substantially within casting 34 and in the lower portion of section 21, shaft 28 is provided with a pumping device 37. As shown in Figures 1 and 5, said pumping device may be the impeller type consisting of a plurality of blades 38 attached by their inner edges to an upwardly flared annular arcuate wall 39. This wall, in turn, is carried by a hub 40 splined to shaft 28 and locked thereon by means of a key 41. Such connection permits the moving of the device 37 longitudinally along shaft 28 but prevents any relative rotation of the pumping device with respect to the shaft. The outer edges of blades 38 carry a ring 42 which is annular in shape and adapted to freely move longitudinally within casting 34. The purpose of this movement will be described hereinbelow.

Above pumping device 37 section 21 is provided with an opening and upwardly extending nozzle 43 adapted to be used for the injection and/or introduction of air or similar oxygen-containing gas. Above said gas entrance shaft 28 is equipped with a plurality of baffles or mixers 45 and 46 in the form of inverted plumb bobs. As in the case of impeller pump 37 these mixers 45 and 46 are provided with slot and key connections 47 and 48 respectively to permit relative longitudinal motion but to prevent any relative rotational movement of the mixers with respect to shaft 28. Housing 20 is constructed so that constrictions 50 are provided between the inner walls of housing 20 and the mixers 45 and 46, the annular space thus formed being regulable by the raising and lowering of said plumb bob type mixers 45 and 46. Above mixer 46 shaft 28 carries a Pelton wheel 53, the blades of said Pelton wheel being directed so that the velocity of the upwardly moving fluid may be transformed into energy to aid the rotation of shaft 28. This Pelton wheel is also attached to shaft 28 by means of a slot and key connection 54. Section 25 above the Pelton wheel 53 is provided with a plurality of slots or openings 55 adapted to communicate the interior of housing 20 with the exterior thereof. The upper end of shaft 31 may be provided with adjusting means 57 adapted to raise and/or lower shaft 31 and therefore shaft 28 at will, thus providing means for controlling the annular space between constrictions 50 and mixers 45 and 46. The above described construction of the lower outer portion of frame 40 and of casting 34 is to permit said vertical movement of shaft 28 and of the pumping and mixing devices carried thereby without causing the removal of pumping element 37 out of its supporting means.

As shown in Figure 1 the pumping, circulating and agitating structure described hereinabove is disposed within a still 60 so that motor 32 and packing gland 30 protrude out from said still, the lower end of the structure being supported substantially at the lower end of said still by means 61. This support is for the purpose of preventing the swinging of the structure.

In operation, shaft 28 is rotated by motor 32 in the direction shown by the arrow in Figure 1. The pumping device or impeller 37 actuated by the rotation of shaft 28 causes the oil entering through openings 35 to be delivered at a fairly uniform rate into section 21 and to be moved upwardly in the housing 20. Simultaneously, air or a similar oxygen-containing gas is introduced into the upper portion of section 21 through the pipe connected to nozzle 43. As shown in Figure 1 section 21 has a gradually decreasing cross-sectional area from the lower portion of said section towards its upper end. This creates a Venturi effect, thereby permitting the introduction of the oxygen-containing gas through nozzle 43 at a substantially lower pressure.

The oil-air mixture then passes through section 22 and through the annular space 50 formed by the inner walls of housing 20 and mixer 45. The rotation of said mixer 45 and the passage of the mixture through the restricted annular opening produces a very intimate commingling of the oil and air. The degree of agitation and/or commingling may be varied by raising or lowering mixer 45 by means of the adjusting means 57 at the upper end of shaft 31 connected to shaft 28. The thus commingled oil-air mixture then passes through a similar restricted annular mixing zone between mixer 46 and the inner wall of housing 20. After being thus again thoroughly commingled, the mixture passes upwardly through section 24 wherein it comes in contact with the blades of Pelton wheel 53. The velocity of the upwardly moving oil-air mixture is thus transformed into energy for the rotation of shaft 28. This naturally decreases the over-all horsepower required to circulate the liquid and gas through the above described structure. After passage through said Pelton wheel the oil-air mixture rises into section 25 from which it overflows through openings or slots 55 into the still from which the oil was originally withdrawn through openings 35.

The Venturi-shaped construction of section 21 causes the oil forced upwardly by pump 37 to be thrown in section 22 across the path of the incoming air introduced through nozzle 43. This aids in the intimate commingling of the two substances. Similarly, the constriction in the upper portion of section 23 forces the oil-air mixture against the lower face of plumb-bob mixer 46. The eddy currents thus created further intermingle the particles of oil and air. The arcuate shape of the lower face of the plumb-bob type mixers 45, 46 causes the liquid-gas mixture to flow smoothly towards and through the controllable annular orifices 50 between said mixers and the inner walls of the housing. This obviously reduces friction losses.

The mixer shown in Figure 7 may be substituted for either or both mixers 45 and 46. In this modification, shaft 28 is equipped with a conical device 62 provided with slotted openings 63. The conical device 62 is attached rigidly to shaft 28, but may be moved at will longitudinally along said shaft due to the slot and key arrangement 64. In operation, the rotation of shaft 28 and of the slotted conical device 62 causes a thorough commingling of the upwardly moving oil-air mixture. By lowering or raising the conical device 62 (with respect to the constriction 50), it is possible to cause any desired portion of the upwardly moving mixture to pass through the slots 63, the balance being by-passed through the annular space or constriction 50. Obviously, the passage of the oil through the slots 63 causes a thorough mixing, which is augmented by the centrifugal force conveyed to the oil-air mixture by the rotation of device 62.

The structure shown in Figure 8 is a modified embodiment of the present invention. In this case housing 120 essentially consists of sections 121, 122, 123, 124 and 125 corresponding to sections 21—25 of Figure 1. Similarly to the structure disclosed in connection with Figure 1, housing 120 is provided with a shaft 28 extending through the longitudinal center of said housing, this shaft passing out of housing 120 through packing 30. This end of shaft 28 is then connected with shaft 31 of the rotor portion of the actuating motor 32. The lower end of shaft 28 is likewise supported in a bearing 29 rigidly attached to the lower end of section 121. As in the previously described structure, the lower end of section 121 is provided with a casting 134 carrying the above mentioned bearing 29 and being provided with a plurality of openings 35 adapted to communicate the interior of section 121 with the outside. Substantially immediately above bearing 29, shaft 28 is provided with a pumping device 127 consisting of an ordinary screw impeller attached to shaft 28 by means of a slot and key connection 128. This connection 128 permits, at will, the movement of impeller 127 longitudinally along shaft 28 but prevents any relative rotation of the pumping device with respect to said shaft. Section 122 attached to the upper end of section 121 is provided with an air inlet 143. Section 122 is constructed so as to have the form of a Venturi tube having a gradually reduced cross sectional area from its lower end substantially to the point of entrance of air to nozzle 143, the cross sectional area therefrom gradually increasing towards the upper end of said section 122. The first portion of section 122 is indicated by numeral 131 while the second portion carries the numeral 132. The slightly enlarged space between said portions is indicated by numeral 133 and is used for the commingling of the upwardly moving oil and the air introduced through pipe 143.

Substantially in the lower portions of sections 122 and 123, shaft 28 is provided with pumping devices 137, which as shown in Figures 8 and 10, may be of the impeller type. These comprise blades 138 attached by their inner edges to upwardly flared annular arcuate walls 139 which in turn are carried by hubs 140 splined to shaft 28 and locked thereon by means of keys 141. When key 141 is removed, the spline connection permits longitudinal movement of the pumps along shaft 28 but prevents any relative rotation of the pumping devices with respect to the shaft. The outer edges of blades 138 carry a ring 142 which may serve as a bearing, guiding and/or sealing element. Blades 138 of the impeller pumps 137 may be either of the solid type shown in connection with the device in section 123, or may be slotted as shown by numeral 144.

As shown in Figure 8, the shells comprising sections 123 and 124 have internal diameters smaller at the ends of said sections as compared with the internal diameter substantially across the medial portions thereof. Frusto-conical elements 146 are disposed in said sections 123 and 124 above impellers or pumping devices 137. These conical elements are spaced from the inner walls of sections 123 and 124 to provide an annular fluid passage 147. The conical elements 146 may each have a central hub 148 having working clearance about shaft 28, the cones having radially extending webs or fingers 149 secured to the outer surfaces of said cones and to the inner walls of shells 123 and 124 respectively. Such an arrangement retains the cones in non-rotating position and at the same time directs the fluid stream upwardly to the intake of the section next above.

The upper end of section 124 opens into section 125 which is similar to section 25 of Figure 1. The annular wall of said section 125 is provided with a plurality of slots or openings 155 adapted to communicate the interior of housing 120 with the exterior thereof. As in the case of the structure described in connection with Figure 1, the structure shown in Figure 8 and described hereinabove is disposed within a still 60 so that the motor 32 and packing gland 30 protrude therefrom. The lower end of the structure is supported substantially at the lower end of the still by means 61 adapted to prevent swinging of the structure.

The pumping devices 137 are designed so that, with a given rate of rotation of shaft 28, their pumping capacity is greater than that of the screw impeller pump 127 located at the lower end of shaft 28. The purpose of such design will be apparent from the following description of the operations of the structure.

In operation of the structure shown in Figure 8, shaft 28 is rotated at a given rate of speed and in the direction shown by the arrow, by means of motor 32. This causes the screw impeller pump 127, to draw the oil through openings 35 and to convey it at a uniform and predetermined rate into section 121 from where it passes through the restricted portion 131 and into portion 132 of section 122. The simultaneous actuation of the impeller 137 causes the oil thus delivered into section 122 to be raised by means of blades 138 into the annular spaces 147 between the inner walls of shell 123 and the above described frusto-conical element 146. Due to the Venturi shape of section 122 and because of the fact that impeller pump 137 is designed for a greater pumping capacity as compared to the screw impeller 127, a reduced or even subatmospheric pressure is created at the throat of the venturi, i. e. in portion 133 of section 122. This permits the introduction of air through 143 at a pressure substantially below that maintained in still 60, or at least, at a pressure below that necessary to overcome the head of oil in the pump and agitator structure 120.

The oil passing upwardly through section 122 and the air introduced through 143 are first commingled during their upward passage through said section. The centrifugal effect of impeller 137 causes a further commingling of the two fluids, the mixture being thrown out against the inner walls of shell 123 by the convolute blades 138. The mixture then rises through passage 147 and is again thoroughly mixed during its passage through the impeller pumping device 137 rotated in section 124. As shown in Figure 8, this pumping device is provided with slots 144 which further aid the thorough commingling of the two substances. After passage through said section 124 the oil-air mixture is then raised into section 125 from which it overflows through slots or openings 155 back into the oil in still 60.

It is quite obvious that the structures disclosed in Figures 1 and 8 may be variously modified without departing from the scope of the present invention. Thus, it is possible to eliminate, in Figure 1, one of the plumb-bob type mixers 45, 46. Also, in Figure 8, I may eliminate either of the pumping elements 137. In the alternative, I may substitute a mixer 45 for one of the pumping elements 137, or employ such mixer 45 in combination with the structure shown in Figure 8. In such a case, the mixer 45 may be placed either between the two pumping elements 137, or above or below them. It is also obvious that a mixer of the type shown in Figure 7 may be used in place of or in conjunction with the mixers and/or pumping elements disclosed hereinabove and shown in Figures 1 and 8.

A further modification is disclosed diagrammatically in Figure 6. In this case the housing 160 of the pumping and agitating structure is disposed horizontally in the still 60. At one end, said housing is provided with an oil inlet opening 161. Shaft 162, extending longitudinally through housing 160, is supported at one of its ends by means of a bearing 163, the other end passing out through the housing, and through the wall of still 60, and being connected to the rotor of a motor 164. Air is introduced into the housing 160 through a pipe 165. Instead of having only one air inlet, the structure is provided with a plurality of such air inlets 166 extending from pipe 165 and opening at spaced intervals into housing 160. Shaft 162 is provided with a plurality of pumping elements 167 and with a plurality of mixers 168. Substantially at the end opposite to oil inlet 161, housing 160 is provided with a discharge opening 169 adapted to return the oil-air mixture back into still 60. The operation of the structure is substantially similar to that described hereinabove in connection with the structure shown in Figure 1 the only difference residing in that the oil is moved in a substantially horizontal path, and in that air is introduced at a plurality of points and is repeatedly and thoroughly commingled with the oil being treated.

Figure 14:
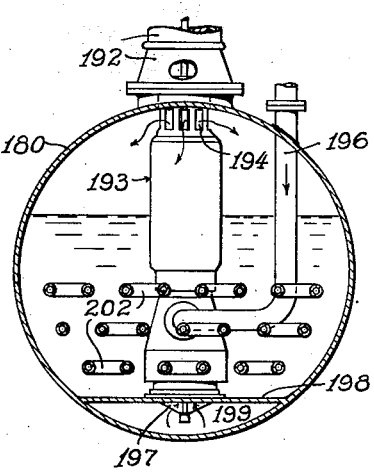
Figure 14 is a section along line 14—14 of Figure 13.

Figures 13 and 14 disclose an embodiment in which a pump and agitating structure of the type shown in Figure 1 or 8 is employed in a still for oxidizing asphaltic oil. In these figures a still 180, provided with the usual manholes 181 and 182, is disposed horizontally on the brickwork 183 of a furnace 184 equipped with a burner 185 connected to a source of fuel not shown. The flue gases from furnace 184 are discharged through opening 186. At one of its ends still 180 is provided with a steam inlet 189, while a vapor discharge opening 190 is provided at the other end of said still.

One of the above described pumping and agitating structures is disposed vertically within still 180 in such a manner that the actuating motor 192 is located outside of said still. The housing 193 of the structure extends downwardly through the upper wall of still 180, and is provided in its upper portion with openings 194 similar to openings 55 of Figure 1. Oxidizing gas, air or steam is introduced into the structure through a pipe 196, while the oil to be agitated enters through the openings 197 in the lower end of housing 193. Said lower end of housing 193 passes through a baffle 198 extending horizontally across the lower portion of the still and substantially, but not quite, the length thereof, thus producing a separated space 199 closed at one end by a baffle 200, the other end 201 being open and communicating with the rest of the interior of still 180. Still 180 is also provided with heating or cooling coils 202 adapted to control the temperature of the oil being oxidized.

In operation, the oil to be oxidized and maintained at a proper temperature by means of the coil 202 and of the furnace 184 is drawn into the pumping and agitating structure through openings 197 at the lower end of housing 193 by means of a pump located therein and actuated by motor 192. Air or a similar oxygen-containing gas is introduced at a predetermined rate through pipe 196. The two fluids, thoroughly agitated and commingled as described hereinabove, are then returned to still 180 through openings 194. The vapors and spent gases are discharged through line 190. The provision of baffling means 199 and 200 prevents the oil from entering the pumping and agitating structure except by first passing through space 199 separated from the rest of the still by said baffling means. It is thus obvious that a current is created in the still, the oil to be oxidized being forced across the whole length of the still prior to the time when said oil enters through 201 into the space 199 and then through openings 197 into the pumping and agitating structure. The provision of such baffling means (as well as of the current produced thereby) aids in a thorough separation of the gas or air from the mixture thereof with the oil coming through openings 194. The provision of these means also aids in a thorough commingling of the oil being oxidized, thus permitting a uniform oxidation of all of the oil in still 180. It is obvious that the oil in still 180 should be initially heated to the incipient oxidation temperature, after which the above-mentioned oxidizing process could be initiated, the coil 202 being used to control the temperature of the oil in the still during the oxidation thereof.

The air-introducing line 196 is provided with a valve 204, which may be of the check-valve or gate-valve type, or said valve may be a combination of both. This valve is to be employed for the purpose of closing the line 196 to prevent asphalt from backing up into said line, when the air stream is shut off. In the alternative, a branch line 205, opening into line 196 at a point between said valve 204 and the pumping and agitating structure, may be adapted to introduce continuously a small quantity of a fluid such as steam, under a relatively high pressure. When this arrangement is used, the closing of the air supply will not affect the operation of the unit since any asphalt backing up into line 196 will be prevented from rising in said line by the pressure of the fluid introduced through branch line 205.

It is obvious that other modifications may be adapted to prevent this undesirable backing up of the oil into the air-supply line 196. Thus, referring more specifically to Figure 1, the lower face of mixer 45 may be provided with blades, etc., adapted to create a centrifugal force in section 22, thereby generating a diminished pressure in 43. Also, shaft 28 may be provided with a pumping unit, such as a screw pump, substantially at the point of introduction of air into the housing 20. Obviously, such pump may be designed so as to prevent any flow of liquid into the air-introducing nozzle 43 and into the pipe conducting such air to said nozzle, even when such air introduction has been stopped.

Although the drawings and the operation of the structures shown therein are described as used for the oxidation of petroleum or asphaltic oils, it is obvious that said structures may also be employed for commingling and agitating any other liquids with gases.

While the invention has been herein disclosed in what is now considered to be the preferred form, it is to be understood that the invention is not limited to the specific details thereof, but covers all changes, modifications and adaptations within the scope of the appended claims.

We claim:

1. A pumping and agitating structure for effecting an interaction betweeen an organic liquid and a gas, which comprises a housing, liquid inlet at one end of said housing, a shaft disposed within said housing and extending therethrough, pumping means on said shaft and substantially near the liquid inlet adapted to draw the liquid into the housing through said liquid inlet, a second pumping means within the housing and on the shaft extending therethrough, said second pumping means possessing a greater pumping capacity than the first mentioned pumping means, thereby effecting a lowering of the pressure in the housing between said pumping means, means to induct a stream of gas into the housing between the two pumping means, agitating means within the housing and on the shaft therein adapted to commingle thoroughly the liquid and gas conveyed thereto by said second pumping means, and discharge means adapted to discharge the liquid and gas mixture out of said housing.

2. In a structure according to claim 1 wherein the two pumping means and the agitating means are actuated by the shaft, and wherein said shaft is provided in said housing substantially near the discharge outlet with means adapted to convert the excess velocity and pressure imparted to the liquid-gas mixture by the pumping means into energy adapted to aid in the actuation of the pumping and agitating means.

3. In a structure according to claim 1, wherein the agitating means are provided with a plurality of openings therethrough to effect a thorough commingling of the liquid and gas conveyed through the housing by the pumping means.

4. A structure for effecting interaction between an organic liquid and a gas, which comprises a housing, gas and liquid inlets into said housing, a rotatable shaft extending the length of said housing and disposed axially therein, motor means for rotating said shaft, pumping means on said shaft between the liquid and gas inlets adapted to impart a velocity head to the liquid passing through said housing, agitating means on said shaft adapted to commingle thoroughly and intimately the gas with the liquid pumped into said housing by said pumping means, and means mounted on said shaft and adapted to receive the mixture and to convert the velocity and pressure head of said fluid into mechanical work, said mechanical work assisting in the rotation of the shaft.

5. In a structure according to claim 4 wherein the agitating means comprise inverted plumb-bobs rotated by the shaft, and wherein the housing is provided with constrictions substantially in the neighborhood of said plumb-bobs, thereby forming annular openings through which the liquid and gas are forced by the pumping means.

6. In a structure according to claim 4 wherein the agitating means comprise inverted plumb-bobs axially disposed on the shaft and rotated thereby, wherein the inner walls of the housing are provided with constrictions in the neighborhood of said plumb-bobs, and wherein said plumb-bobs are adapted to be moved longitudinally on said shaft, thereby permitting the adjustment of the annular space between the inner walls of the housing and said plumb-bobs.

7. A process for producing interaction between a liquid and a gas, which comprises maintaining a bulk supply of the liquid, continuously withdrawing a stream of said liquid from said bulk supply into a restricted zone and imparting to said stream a relatively high velocity head, converting a portion of said velocity head into pressure head, commingling the thus withdrawn liquid with a gas, mechanically agitating the thus produced mixture in said restricted zone and simultaneously reconverting part of the pressure head into velocity head, recovering said velocity head in the form of mechanical work to assist in the withdrawal, commingling and agitation of the mixture in the restricted zone, and returning the agitated mixture back into said bulk supply.

8. A fluid mixing apparatus including a motor, a rotary shaft driven by said motor, a rotary fluid propeller mounted on said shaft and adapted to receive a mixture of fluids and to discharge same at a relatively high velocity head, a stationary casing adapted to receive the fluid discharged by said propeller and to convert said velocity head into pressure head, a Venturi injector adapted to receive said high velocity fluid and to inject other fluid into said stream of fluid, a second stationary casing adapted to receive said fluid and to reconvert a part of the pressure head into velocity head, a turbine runner mounted on said shaft and adapted to receive the fluid from said second casing and to convert a substantial portion of the velocity and pressure head into mechanical work applied to said shaft to assist in the rotation of same, and means for returning a portion of the fluid mixture discharged from said turbine runner to said first rotary propeller for recirculation.

9. A fluid mixing apparatus comprising a stationary casing having a fluid inlet at one end and an outlet at its opposite end, a shaft extending through said casing, motor means for rotating said shaft, a rotary fluid propeller mounted on said shaft adjacent the inlet end of said casing, and adapted to impart a high velocity head to fluid passing through said casing, means in said casing for converting the velocity head of said fluid into pressure head and for reconverting part of said pressure head into velocity head, and a turbine runner mounted on said shaft and adapted to receive the fluid from said converting means whereby a part of the velocity and pressure head of said fluid is substantially converted into mechanical work by the turbine runner and applied to said shaft to assist in the rotation of same.

10. A fluid mixing apparatus including a motor, stationary casing means, a rotary shaft driven by said motor and extending through said casing, a rotary fluid propeller mounted on said shaft and adapted to receive fluid and to discharge same at a relatively high head, means for introducing a second fluid into the stream of fluid discharged from said rotary propeller, a second rotary fluid propeller mounted on said shaft and adapted to receive the mixture of fluids and to discharge same at a relatively high velocity head, means in said casing adapted to convert said high velocity head into pressure and to reconvert a part of said pressure head into velocity head, a turbine runner mounted on said shaft and adapted to receive the fluid discharged from said conversion means and to transform a substantial portion of the velocity and pressure head of said fluid into mechanical work applied to said shaft to assist in the rotation of same, and a discharge outlet from said casing beyond said turbine runner.

11. A fluid mixing apparatus including a motor, a rotary shaft driven by said motor, a rotary fluid propeller mounted on said shaft and adapted to receive fluid and to discharge same at a relatively high velocity head, a stationary casing adapted to receive the fluid discharged by said propeller and to convert said velocity head into pressure head, means for introducing a second fluid into the stream of fluid discharged from said centrifugal impeller, a second rotary fluid propeller mounted on said shaft and adapted to receive the mixture of fluids and to discharge same at a relatively high velocity head, a second stationary casing adapted to receive the fluid discharged by said second propeller and to convert said velocity head into pressure head and to reconvert a part of said pressure head into velocity head, a turbine runner mounted on said shaft and adapted to receive the fluid discharged from said second fluid propeller and to convert substantially all of the velocity and pressure head of said mixture of fluids into mechanical work applied to shaft to assist in the rotation of same, and means for returning a portion of said mixture to said first rotary propeller for recirculation of the fluid.

12. A fluid mixing apparatus including a motor, a rotary shaft driven by said motor, a rotary fluid propeller mounted on said shaft and adapted to receive a mixture of fluids and discharge the mixture at a relatively high velocity head, a stationary casing adapted to receive said high velocity fluid and convert said velocity head into pressure and reconvert a part of said pressure head into velocity head, and a turbine runner mounted on said shaft and adapted to receive said fluid and to convert a substantial portion of the velocity and pressure head of said fluid into mechanical work applied to said shaft to assist in the rotation of same.

13. A fluid mixing apparatus including a tank adapted to receive a mixture of fluids, a motor mounted on said tank, a rotary shaft driven by said motor and extending into said tank, a rotary fluid propeller mounted on said shaft near the lower end thereof and adapted to receive fluid from said tank at substantially zero head and to discharge same at a relatively high velocity head, a stationary casing adapted to receive said fluid and to convert said velocity head into pressure head and to reconvert part of said pressure head into velocity head, and a turbine runner mounted on said shaft and adapted to receive the fluid from said casing and to convert the velocity and pressure head into mechanical work applied to said shaft to assist in the rotation of same and to discharge the mixed fluids at substantially zero head into said tank for recirculation.

14. In a fluid mixing apparatus a motor, a rotary shaft driven by said motor, a rotary fluid propeller mounted on said shaft and adapted to receive a mixture of fluids and to discharge same at a high velocity head, a stationary casing adapted to receive said high velocity fluid and to convert the velocity head of said fluid into pressure head, a second casing adapted to receive said high pressure fluid and reconvert a part of said pressure head into velocity head, a turbine runner mounted on said shaft and adapted to receive said fluid and to transform a part of said velocity and pressure head into mechanical work applied to said shaft to assist in the rotation of same, and a discharge outlet from said casing beyond said turbine runner.

15. A structure for effecting interaction between an organic liquid and a gas, which comprises a housing, a liquid inlet at one end thereof, a discharge outlet in said housing, pumping means in said housing adapted to draw a stream of liquid continuously through said liquid inlet into said housing and to impart to said liquid a velocity head, a gas inlet adapted to introduce continuously a stream of gas into the stream of liquid and to effect a commingling of the two fluids, agitating means in said housing adapted to cause a further intimate commingling of said fluids, said agitating means being further adapted to control the degree of agitation and intimate contacting of the particles of said liquid and gas, and means near the discharge outlet adapted to receive the fluids, to convert a substantial portion of their velocity head into mechanical energy, and to apply said energy to the pumping means to assist in conveying the liquid through the housing.

EARLE W. GARD.
BLAIR G. ALDRIDGE.